(12) United States Patent
Olsen et al.

(10) Patent No.: US 7,001,033 B1
(45) Date of Patent: Feb. 21, 2006

(54) IMAGE DISPLAY DEVICE

(76) Inventors: Gordon Olsen, 303 Silverado Pines, Las Vegas, NV (US) 89123; James W. Boyd, 561 Benedetti Dr., Naperville, IL (US) 60563; Thomas R. Boyd, 2334 W. Dickens, Apt. 1, Chicago, IL (US) 60647

( * ) Notice: Subject to any disclaimer, the term of this patent is extended or adjusted under 35 U.S.C. 154(b) by 0 days.

(21) Appl. No.: 11/224,855

(22) Filed: Sep. 12, 2005

(51) Int. Cl.
*G02B 27/10* (2006.01)

(52) U.S. Cl. .................. 359/869; 359/631; 359/868; 359/630; 359/629

(58) Field of Classification Search ............... 359/869, 359/868, 631, 630, 629, 871, 872, 860
See application file for complete search history.

(56) References Cited

U.S. PATENT DOCUMENTS

2003/0107816 A1* 6/2003 Takagi et al. ............... 359/631

* cited by examiner

*Primary Examiner*—Timothy Thompson
(74) *Attorney, Agent, or Firm*—Park Law Firm; John K. Park

(57) ABSTRACT

An image display device includes a case with an opening, a luminous source image display displaying a first image, and a focusing element. The focusing element is positioned within the case, and includes a concave mirror and a mirror supporter that supports the concave mirror. The mirror supporter includes a mirror cradle. The mirror screen is mounted on the arms of the mirror cradle. The mirror cradle includes a buffering pad at the tip of each arm, and the buffering pad includes adhesive parts on both surfaces. The tip of the arms of the mirror cradle is attached to the back of the mirror screen, and the attachment is achieved with a surface contact. The mounting holes on the top and bottom plates are oblong. The oblong mounting holes are adapted to adjust the mounting position of the mirror screen of the image display device.

18 Claims, 5 Drawing Sheets

IMAGE DISPLAY DEVICE

BACKGROUND OF THE INVENTION

The present invention relates to an image display device. More particularly, this invention relates to an image display device, in which the mirror screen is installed on a mirror cradle by a surface contact. Also, this invention is related to an image display device, in which the adjustment of the mirror screen is obtained easily with the mechanical adjustment.

An image display device for three-dimensional imagery has been disclosed by U.S. patent application Ser. No. 10/775,636 by the applicant. It includes a case, a luminous source image, and a focusing element. And, the focusing element is for receiving light from the source image display and focusing the light to form a second image that is viewable through the opening of the case, and comprises a concave mirror and a mirror supporter. In this setup, the image is reflected from the mirror, and the focusing of image is determined by the relative position and angle of the luminous source images, the mirror, and the opening of the case. Therefore, a fine adjustment of the position and angle of the parts, especially the concave mirror, is crucial to obtaining the best three-dimensional image.

Another important point in installing the mirror screen is that the installing structure should not introduce any stress to the mirror screen. Otherwise, the quality of the image reflected from the stressed and distorted mirror screen is damaged. Since the mirror screen is concave, it is challenging to install the mirror screen without introducing a mechanical stress to the contacting points.

Accordingly, a need for an installment structure of the image display device has been present from the invention of the image display device. This invention is directed to solve these problems and satisfy the long-felt need.

SUMMARY OF THE INVENTION

An objective of the invention is to provide an image display device, which is easy to install the mirror screen.

Another objective of the invention is to provide an image display device, which is easy to adjust the position and angle of the mirror screen in order to obtain a good image focused clearly.

Still another objective of the invention is to provide an image display device, which holds the mirror screen in place without incurring any stress onto the mirror screen.

An image display device includes a case with an opening, an image source, a luminous source image display displaying a first image from the image source, and a focusing element receiving light from the source image display and focusing the light to form a second image that is viewable through the opening of the case. The source image display is positioned within the case. The focusing element is positioned within the case, and includes a concave mirror and a mirror supporter that supports the concave mirror. And, the mirror supporter includes a mirror cradle comprising a central portion with two or more arms extending from the central portion for holding the mirror screen. The mirror screen is mounted on the arms of the mirror cradle.

The mirror cradle further includes a buffering pad at the tip of each arm, and the buffering pad includes adhesive parts on both surfaces. The tip of the arms of the mirror cradle is attached to the back of the mirror screen, and the attachment is achieved with a surface contact.

The mirror supporter further includes a cradle holder provided inside the case to hold the mirror cradle. The cradle holder includes a top plate with one or more mounting holes, a bottom plate, and one or more poles, and the top and bottom plates are rectangular.

The poles of the cradle holder connect the top plate and the bottom plate, and the angle between the plane of the top plate and the plane of the bottom plate is from about 60 degrees to about 120 degrees, substantially a right angle. The poles are L-shaped with a long portion and a short portion, and the short portion is engaged with an edge of the bottom plate and the long portion is engaged with an edge of the top plate.

The mounting holes on the top plate are oblong along the direction perpendicular to the normal line to the plane of the bottom plate. The oblong mounting holes are adapted to adjust the mounting position of the mirror screen of the image display device.

The bottom plate of the cradle holder includes a plurality of mounting holes. The mounting holes on the bottom plate are oblong along the direction perpendicular to the normal line to the plane of the top plate. The oblong mounting holes are adapted to adjust the mounting position of the image source of the image display device.

The mirror supporter further includes two tracks with mounting holes for connecting the cradle holder and the body of the image display device. The tracks are mechanically engaged with the bottom plate of the mirror cradle.

In order to mount the mirror cradle on the cradle holder or to mount the cradle holder on the tracks, the bolts and nuts may be used.

The mounting holes on the tracks are used to fix the tracks themselves in the case of the image display device and to mount the cradle holder onto the tracks themselves.

The mirror cradle is made of metal of about 1/16 inches of thickness.

In the image display device according to the invention, the installment and adjustment of the mirror screen are done easily, and especially the mirror screen can be installed without any mechanical stress introduced. In addition to these advantages, the installing parts are manufactured economically.

The source image display is located above the mirror screen and separated completely from the lower part of the image display device. Therefore, the image source and other parts are isolated from the outside, preventing any possibility of foreign objects such as trash falling into the inside of the device.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

The U.S. patent application Ser. No. 10/775,636 is incorporated by reference into this disclosure as if fully set forth herein.

Figure 1:
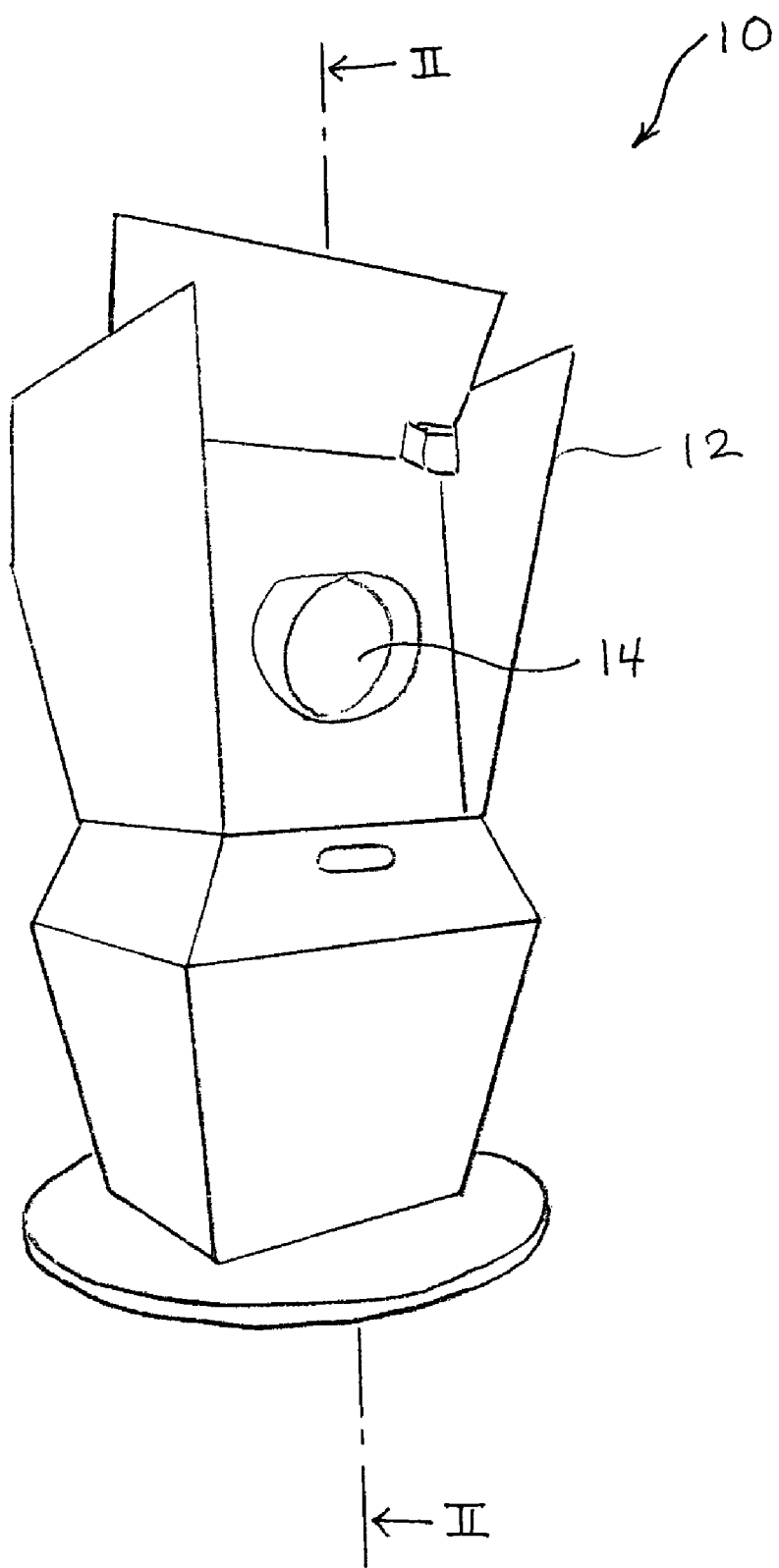
FIG. 1 is a perspective view of an image display device according to the invention.
Figure 2:
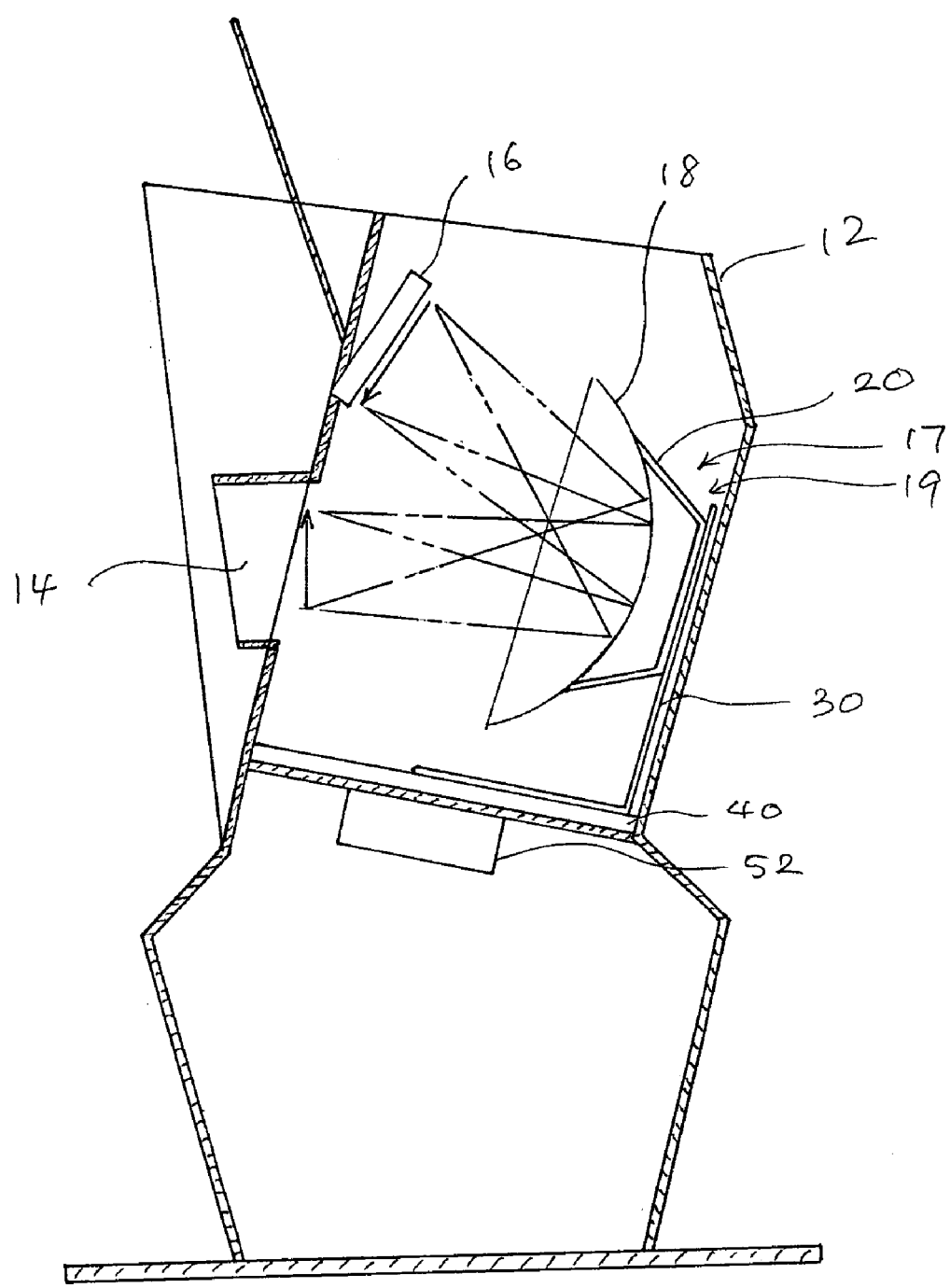
FIG. 2 is a cross-sectional view taken along line II—II of FIG. 1.

FIG. 1 and FIG. 2 show an image display device according to the invention.

An image display device 10 includes a case 12 with an opening 14, an image source 52, a luminous source image display 16 displaying a first image from the image source 52, and a focusing element 17 receiving light from the source image display 16 and focusing the light to form a second image that is viewable through the opening 14 of the case 12. The source image display 16 is positioned at the top inside the case 12. The focusing element 17 is positioned within the case 12, and includes a concave mirror 18 and a mirror supporter 19 that supports the concave mirror 18.

Figure 3:
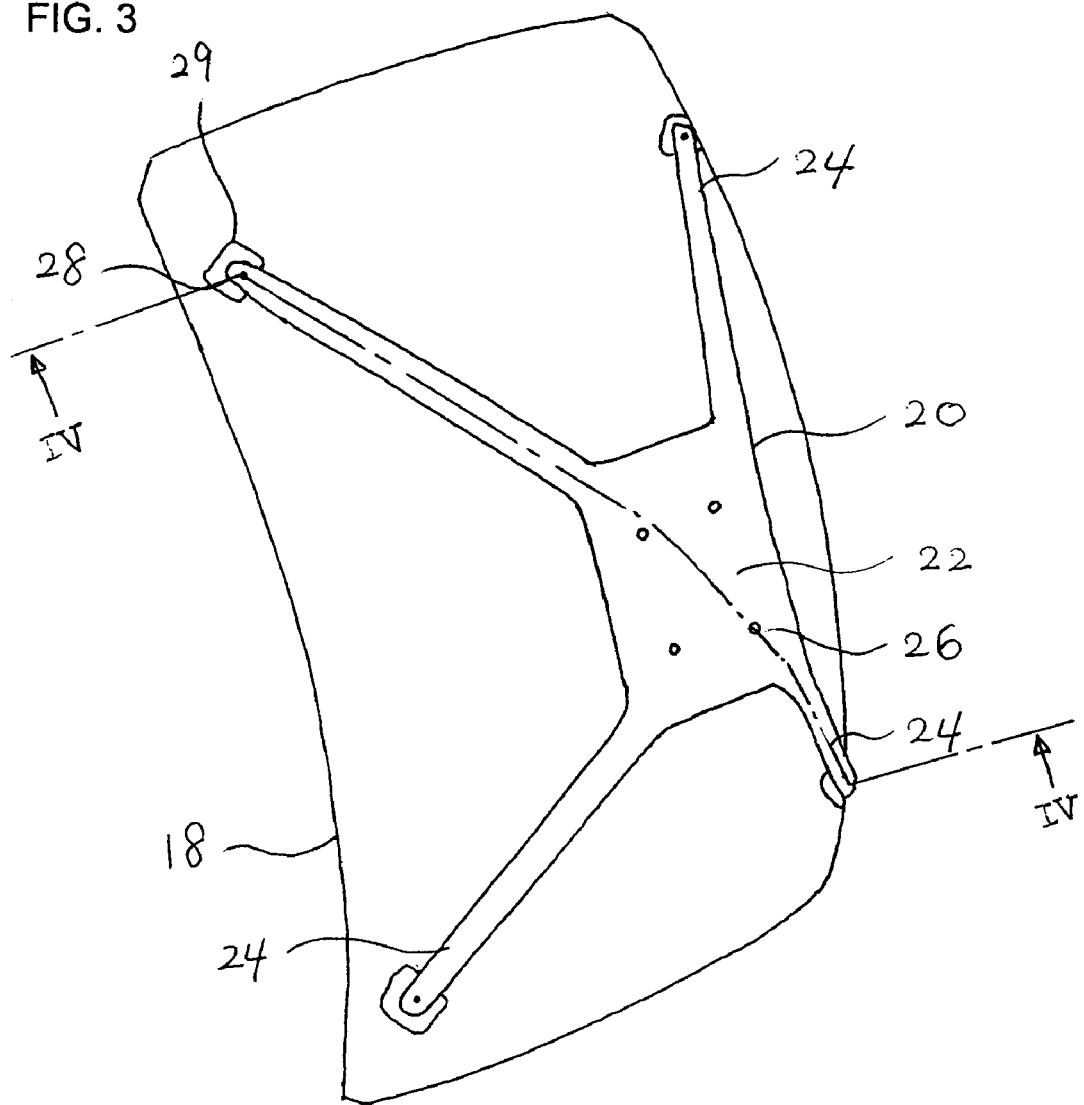
FIG. 3 is a perspective view of a mirror cradle holding a mirror screen.
Figure 4:
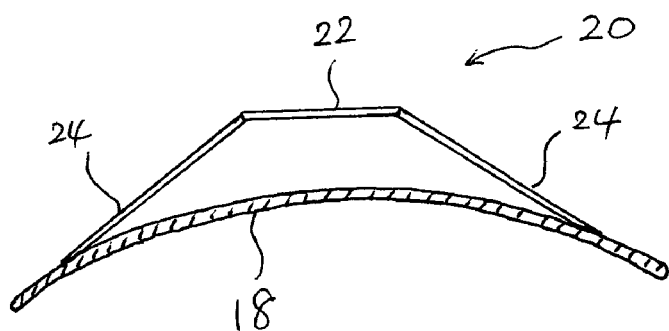
FIG. 4 is a cross-sectional view taken along line IV—IV of FIG. 3.

As shown in FIG. 3 and FIG. 4, the mirror supporter 19 includes a mirror cradle 20 having a central portion 22 with two or more arms 24 extending from the central portion 22 for holding the mirror screen 18. The mirror screen 18 is mounted on the arms 24 of the mirror cradle 20.

The mirror cradle 20 further includes a buffering pad 29 at the tip 28 of each arm 24, and the buffering pad 29 includes adhesive parts on both surfaces. The tip 28 of the arms 24 of the mirror cradle 20 is attached to the back of the mirror screen 18, and the attachment is achieved with a surface contact, which does not introduce mechanical stress on the mirror screen 18.

Figure 5:
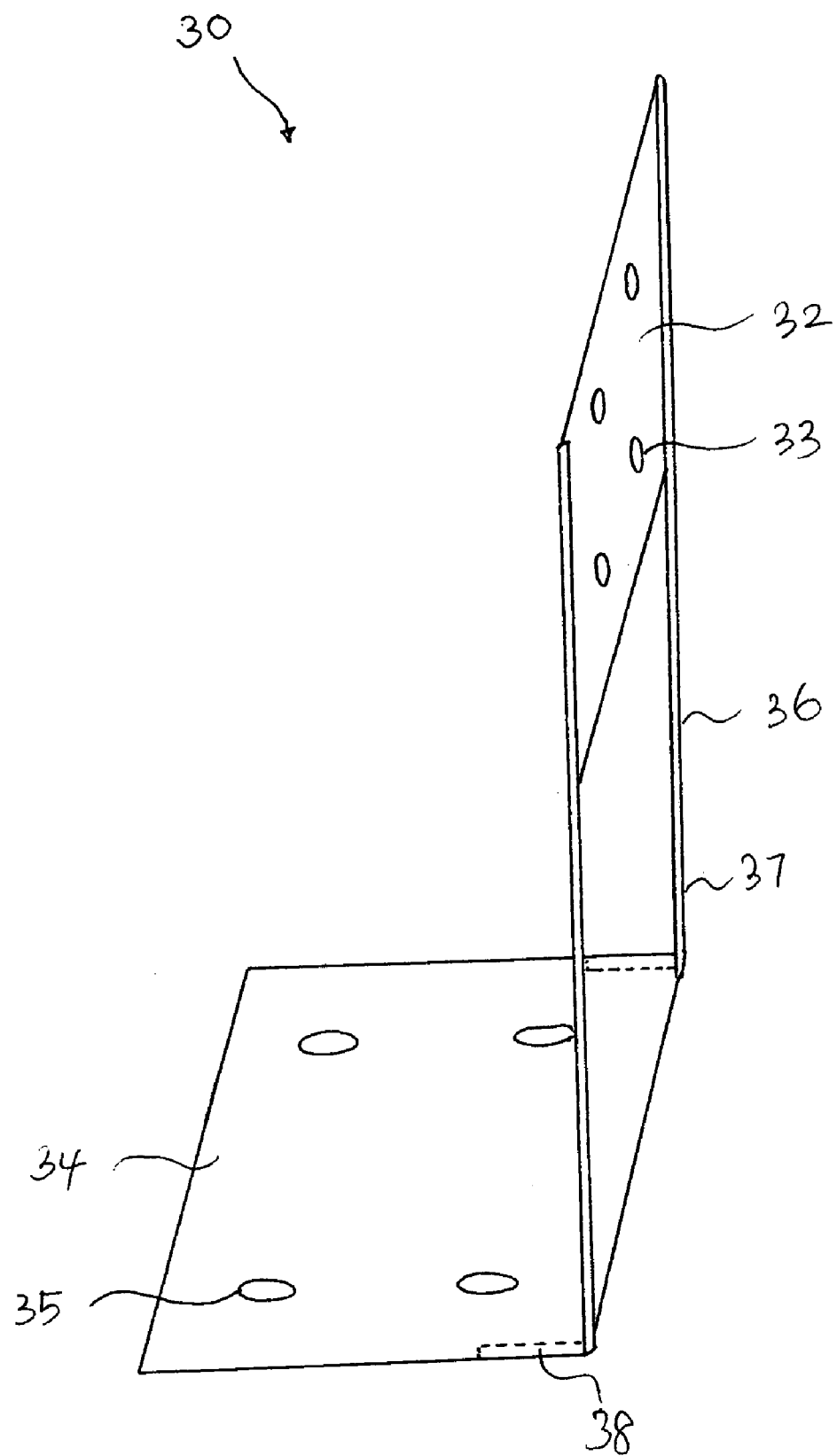
FIG. 5 is a perspective view of a cradle holder.

As shown in FIG. 1 and FIG. 5, the mirror supporter 19 further includes a cradle holder 30 provided inside the case 12 to hold the mirror cradle 20. The cradle holder includes a top plate 32, a bottom plate 34, and one or more poles 36, and the top and bottom plates 32, 34 are rectangular. The top plate 32 of the cradle holder 30 includes a plurality of mounting holes 33, on which the central plate 22 of the mirror cradle 20 is attached.

The poles 36 of the cradle holder 30 connect the top plate 32 and the bottom plate 34, and the angle between the plane of the top plate 32 and the plane of the bottom plate 34 is from about 60 degrees to about 120 degrees, substantially a right angle. The poles 36 are L-shaped with a long portion 37 and a short portion 38, and the short portion 38 is engaged with an edge of the bottom plate 34 and the long portion 37 is engaged with an edge of the top plate 32.

The mounting holes 33 on the top plate 32 are oblong along the direction perpendicular to the normal line to the plane of the bottom plate 34. The oblong mounting holes 33 are adapted to adjust the mounting position of the mirror screen 18 of the image display device 10.

The bottom plate 34 of the cradle holder 20 includes a plurality of mounting holes 35. The mounting holes 35 on the bottom plate 34 are oblong along the direction perpendicular to the normal line to the plane of the top plate 32. The oblong mounting holes 35 are adapted to adjust the mounting position of the peripheral devices which are not shown.

Figure 6:
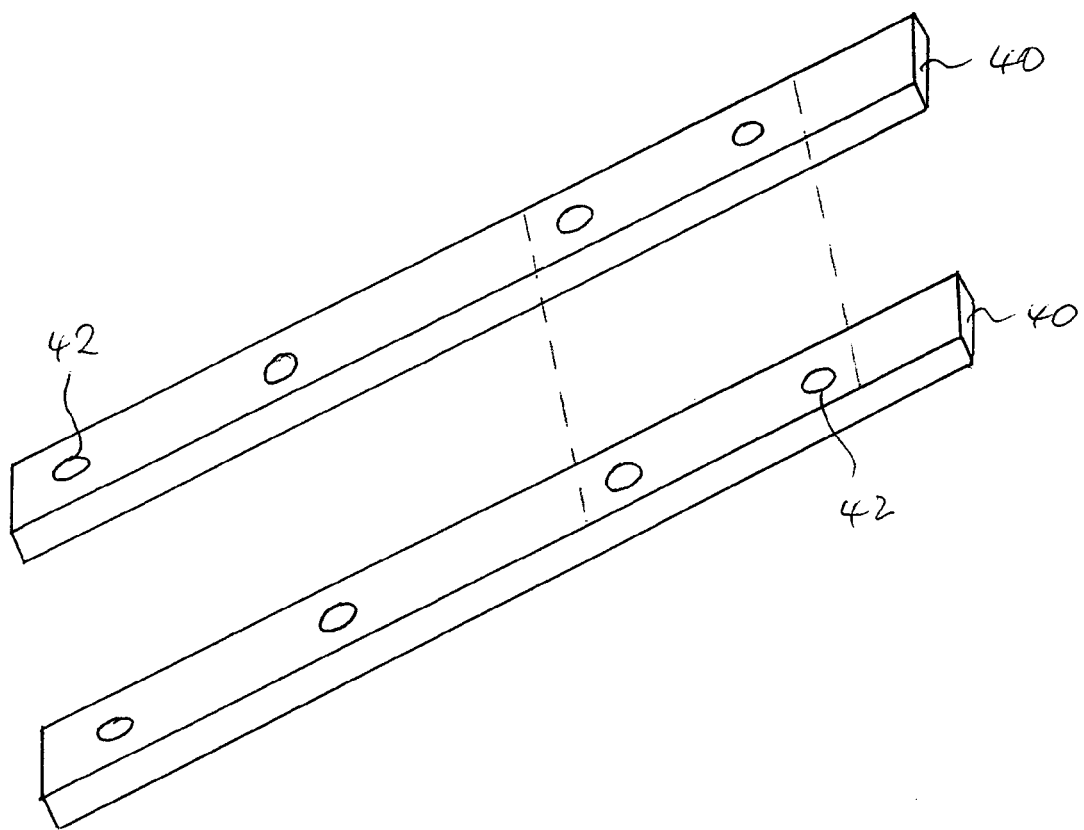
FIG. 6 is a perspective view of tracks.

As shown in FIG. 1 and FIG. 6, the mirror supporter 19 further includes two tracks 40 with mounting holes 42 for connecting the cradle holder 30 and the body of the image display device 10. The tracks 40 are mechanically engaged with the bottom plate 34 of the cradle holder 30 using the mounting holes 35 of the bottom plate 34 of the cradle holder 30 and the tracks 40.

In order to mount the mirror cradle 20 on the cradle holder 30 or to mount the cradle holder 30 on the tracks 40, the bolts and nuts may be used.

The mounting holes 42 on the tracks 40 are used to fix the tracks 40 themselves the case 12 of the image display device 10 and to mount the cradle holder 30 onto the tracks 30 themselves.

The mirror cradle 20 is made of metal of about 1/16 inches of thickness.

The source image display 16 is located above the mirror screen 18 and separated completely from the lower part of the system 10. Therefore, the image source 52 and other parts are isolated from the outside, preventing any possibility of foreign objects such as trash falling into the inside of the system 10.

The concave mirror 18 may comprise a stamped metal mirror with highly reflective surface on the concave face, which is of the same shape and size of the drawn plastic mirror.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An image display device, comprising a case comprising an opening, a luminous source image display displaying a first image, wherein the source image display is positioned within the case, and a focusing element receiving light from the source image display and focusing the light to form a second image that is viewable through the opening of the case, wherein the focusing element is positioned within the case, wherein the focusing element comprises a concave mirror and a mirror supporter that supports the concave mirror, wherein the mirror supporter comprises a mirror cradle comprising a central portion with two or more arms extending from the central portion for holding the mirror screen, wherein the mirror screen is mounted on the arms of the mirror cradle.

2. The image display device of claim 1, wherein the mirror cradle further comprises a buffering pad at the tip of each arm.

3. The image display device of claim 2, wherein the buffering pad comprises adhesive parts on both surfaces.

4. The image display device of claim 3, wherein the tip of the arms of the mirror cradle is attached to the back of the mirror screen, wherein the attachment is achieved with a surface contact.

5. The image display device of claim 1, wherein the mirror supporter further comprises a cradle holder provided inside the case to hold the mirror cradle.

6. The image display device of claim 5, wherein the cradle holder comprises a top plate, a bottom plate, and one or more poles, wherein the top and bottom plates are rectangular.

7. The image display device of claim 6, wherein the top plate of the cradle holder comprises a plurality of mounting holes.

8. The image display device of claim 7, wherein the poles of the cradle holder connects the top plate and the bottom plate, wherein the angle between the plane of the top plate and the plane of the bottom plate is from about sixty (60) to about one hundred twenty (120) degrees.

9. The image display device of claim 8, wherein the angle between the plane of the top plate and the plane of the bottom plate is substantially a right angle.

10. The image display device of claim 8, wherein the poles are L-shaped with a long portion and a short portion, wherein the short portion is engaged with an edge of the bottom plate and the long portion is engaged with an edge of the top plate.

11. The image display device of claim 6, wherein the mounting holes on the top plate are oblong along the direction perpendicular to the normal line to the plane of the bottom plate.

12. The image display device of claim 11, wherein the oblong mounting holes are adapted to adjust the mounting position of the mirror screen of the image display device.

13. The image display device of claim 6, wherein the bottom plate of the cradle holder comprises a plurality of mounting holes.

14. The image display device of claim 13, wherein the mounting holes on the bottom plate are oblong along the direction perpendicular to the normal line to the plane of the top plate.

15. The image display device of claim 14, wherein the oblong mounting holes are adapted to adjust the mounting position of the image source of the image display device.

16. The image display device of claim 1, where in the mirror supporter further comprises two tracks with mounting holes for connecting the cradle holder and the body of the image display device.

17. The image display device of claim 16, wherein the tracks are mechanically engaged with the bottom plate of the cradle holder.

18. The image display device of claim 1, wherein the mirror cradle is made of metal of about 1/16 inches of thickness.

* * * * *